United States Patent
Li et al.

(10) Patent No.: US 12,299,134 B1
(45) Date of Patent: May 13, 2025

(54) KNOWLEDGE-BASED TAINT POLICY INFERENCE

(71) Applicant: Amazon Technologies, Inc., Seattle, WA (US)

(72) Inventors: Peixuan Li, State College, PA (US); Yingjun Lyu, Los Angeles, CA (US); Qiang Zhou, San Jose, CA (US); Lee Pike, Portland, OR (US); Michael McDougall, Seattle, WA (US); Thodoris Sotiropoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 17/936,993

(22) Filed: Sep. 30, 2022

(51) Int. Cl.
  *G06F 21/57* (2013.01)
  *G06N 5/022* (2023.01)

(52) U.S. Cl.
  CPC .......... *G06F 21/577* (2013.01); *G06N 5/022* (2013.01); *G06F 2221/033* (2013.01)

(58) Field of Classification Search
  None
  See application file for complete search history.

(56) References Cited

U.S. PATENT DOCUMENTS

| | | | |
|---|---|---|---|
| 10,460,112 B2 | 10/2019 | Chen et al. | |
| 11,023,580 B1* | 6/2021 | Han | G06F 21/564 |
| 11,354,433 B1* | 6/2022 | Sun | G06F 21/6245 |
| 11,822,459 B2* | 11/2023 | Chandramohan | G06N 3/04 |
| 2008/0216175 A1* | 9/2008 | Pike | G06F 21/52 726/22 |
| 2012/0210432 A1* | 8/2012 | Pistoia | G06F 11/3604 726/25 |
| 2015/0288705 A1* | 10/2015 | Ligman | H04L 63/20 726/1 |
| 2017/0220806 A1* | 8/2017 | Munoz | G06F 21/577 |

\* cited by examiner

*Primary Examiner* — Atta Khan
(74) *Attorney, Agent, or Firm* — S. Scott Foster; Kowert, Hood, Munyon, Rankin & Goetzel, P.C.

(57) ABSTRACT

Security vulnerability analysis may be performed using policy inference. Application code may have operations that are labeled according to the respective functions that they perform. Some operations may be labeled according to a knowledge database of known operations while others may be inferred through similarity to known operations. The knowledge database may be associated with libraries of programmatic interfaces. Once components of the application code are labeled, a vulnerability database may be that identifies potential vulnerabilities based on data sources, data sinks and threat mitigation operations. Using the labeled operations, one or more potential vulnerabilities may be identified based on labeled data sources and data sinks. The application may then be evaluated for potential security threats based on the identified potential vulnerabilities.

20 Claims, 8 Drawing Sheets

| description 310 | source 311 | sink 312 | sanitizer 313 | severity 314 |
|---|---|---|---|---|
| 320a SQL Injection | net.requestInput | database.query | database.sanitizer | high |
| 320b code Injection | net.requestInput | file.write | shell.sanitizer | high |
| 320c log neutralization | net.requestInput | log.write | log.sanitizer | low |
| 320d broken access control | net.request | net.response | authentication | medium |
| | net.request | database.query | authentication | high | vulnerability dictionary 300

*FIG. 3*

| library operation 510 | knowledge label 520 |
|---|---|
| 511a openConnection() [param0]<br>511b getParameter() [return]<br>511c getInputStream() [return]<br>511d logInfo() [param0] | net.outbound<br>net.request<br>net.reqestInput<br>log.write | knowledge label dictionary 500

*FIG. 5*

KNOWLEDGE-BASED TAINT POLICY INFERENCE

BACKGROUND

A wide class of security vulnerabilities are related to regulating information flows inside an application. These vulnerabilities may be formalized in a taint model, where a source input value should not flow to a sink location in the application unless the flow goes through a sanitizer. Security vulnerability analysis tools verify information flows of a program using these taint policies together with specification of sources, sinks and sanitizers in the application program. The task of providing taint policy, however, is the duty of the tool users. Unfortunately, in practice, maintaining a comprehensive taint policy is usually beyond the capacity of the individual users or even manual efforts of any kind as it requires up-to-date security knowledge to identify potential security issues in full spectrum, program details are error-prone and tedious to verify and policy updates may be too expensive.

BRIEF DESCRIPTION OF THE DRAWINGS

FIG. 3 is a diagram illustrating an example threat dictionary, according to some embodiments.

FIG. 5 is a diagram illustrating knowledge labels providing operation types associated with a knowledge graph, according to some embodiments.

Figure 1:
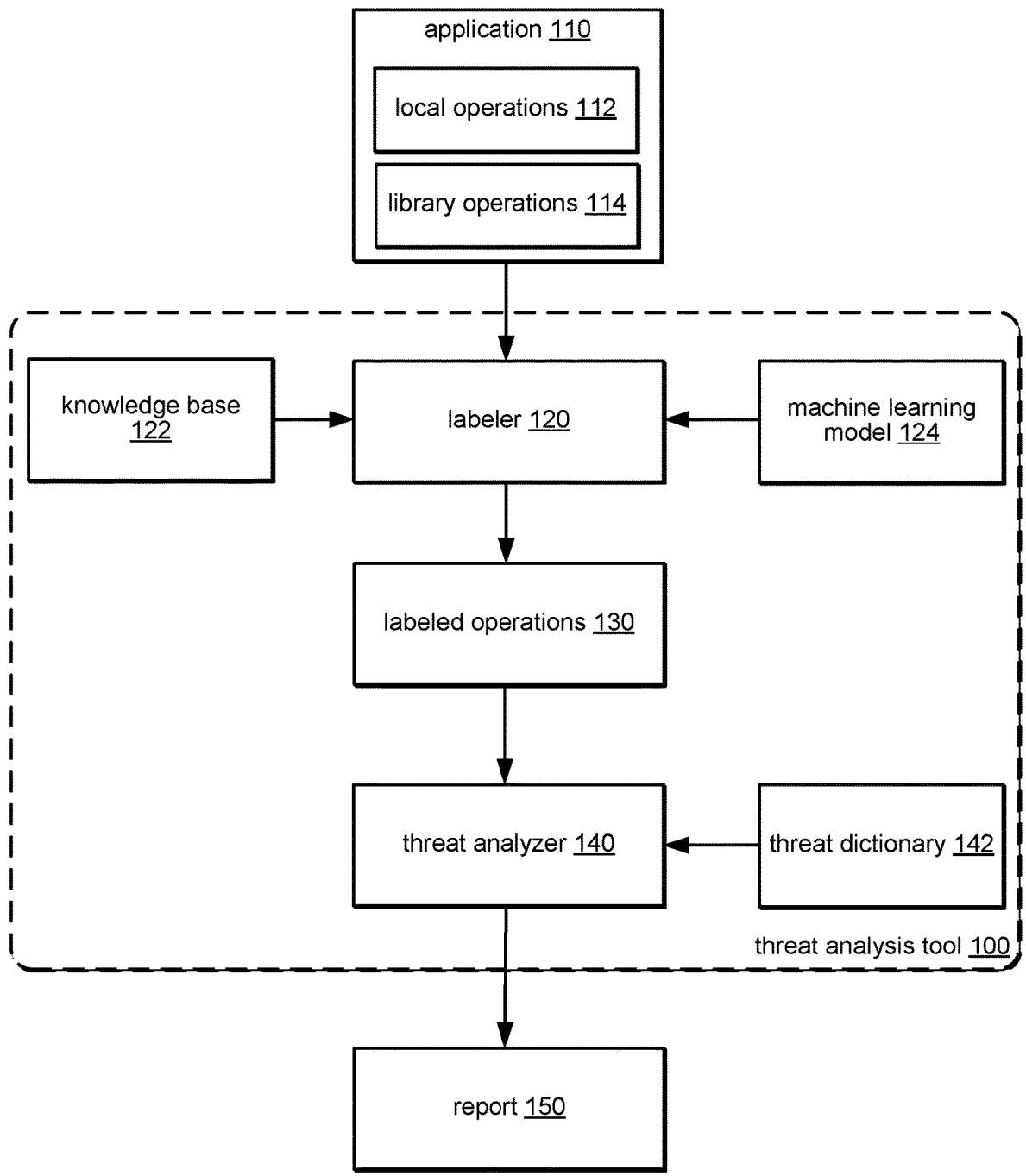
FIG. 1 is a block diagram illustrating a threat analysis tool that that infers application operations, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

A wide class of security vulnerabilities are related to regulating information flows inside an application. These vulnerabilities may be formalized in a taint, or security vulnerability, model where source input values should not flow to sink locations in the application unless the flow first goes through a validation or sanitizing step. For example, to protect confidentiality, sensitive data from a data source should not be leaked to public holders or data sinks while trusted information, a data sink, should not be modified by an untrusted data source unless it is first verified through sanitizer.

Security vulnerability analysis tools may verify information flows of a program using these taint policies along with specification of sources, sinks and sanitizers in the application program. The task of providing taint policy, however, is the duty of the tool users. Unfortunately, in practice, maintaining a comprehensive taint policy is usually beyond the capacity of the individual users or even manual efforts of any kind as it requires up-to-date security knowledge to identify potential security issues in full spectrum, program details are error-prone and tedious to verify and policy updates may be too expensive. Thus, it is clear that automated detection of data sources, sinks and sanitizers is needed in analyzing real world applications.

Existing techniques may expand taint policies based on a small amount of taint policy samples. However, the practical use of these techniques are questionable since they rely on good taint samples as a starting point. In reality, samples can be missing, biased, invalid, or even malicious. More fundamentally, these approaches ignore the root cause of a taint policy, i.e. potential security vulnerabilities, but expand the taint policy through probabilistic constraints on co-occurrence. Thus, there is no guarantee on the quality of the outcome taint policy. Moreover, these approaches are context-insensitive, e.g. an identified source Application Programming Interface (API) is always a source for all programs, which misjudges the subtleties of security vulnerabilities and the flexibility of the real world programs.

What is needed is a knowledge-based taint policy inference technique that produces tailored taint policies backed by known security vulnerabilities.

Systems and methods for implementing security vulnerability analysis using taint policy inference are described herein. Application code may have operations that are labeled according to the respective functions that they perform. Some operations may be labeled according to a knowledge database of known operations while others may be inferred through similarity to known operations. The knowledge database may be associated with libraries of programmatic interfaces. Once components of the application code are labeled, a vulnerability database may be accessed that identifies potential vulnerabilities based on data sources, data sinks and threat mitigation operations. Using the labeled operations, one or more potential vulnerabilities may be identified based on labeled data sources and data sinks. The application may then be evaluated for potential security threats based on the identified potential vulnerabilities.

Such systems and methods may result in taint policies for applications that require no manual annotation or the use of taint policy samples. Furthermore, every inferred taint policy may be backed by known security vulnerability issues, making each identified vulnerability relevant. Inferred policies may be specifically tailored to individual programs or applications and known vulnerabilities that do not apply to an application are not considered in a final analysis. Customized vulnerability dictionaries and customized knowledge bases may be employed, allowing the tools to be extensible and to receive automatic updates. Furthermore, security vulnerability dictionaries may be maintained and extended by experts with specific knowledge in vulnerability domains without burdening developers of the applications themselves with developing and maintaining vulnerability expertise.

FIG. 1 is a block diagram illustrating a threat analysis tool 100 that that infers a taint policy from evaluation of application components, according to some embodiments. An application, or application code, 110 may have methods, functions or operations that perform various ones of well-known tasks. Included in these methods, functions or operations are local operations 112 and library operations 114. While the library operations 114 may be well understood and their functions identified through a knowledge base 122, local operations 112 may be unique to the application and cannot be similarly identified. Therefore, functions performed by all operations of the application 110 may be inferred through similarity to well-known functions or operations through the use of a machine learning model 124 in addition to the knowledge base 122. This process is discussed in greater detail in FIGS. 4, 5 and 7 below.

A labeler 120 may then receive the application 110, identify the operations of the application code, including local operations 112 and library operations 114, and label the operations of the application 110 with various operation types using the knowledge base 122 and the machine learning model 124. The labeler 120 may then produce labeled operations 130, in some embodiments, where individual operations are labeled with operation types suitable for matching with entries in a dictionary of vulnerabilities 142.

The labeled operations 130 may then be received at a threat analyzer 140. The threat analyzer uses a threat dictionary 142 to identify potential security vulnerabilities of the application by matching threat data sources and data sinks with the labeled operation types of the labeled operations 130. This process is discussed in greater detail in FIGS. 3 and 6 below. Once potential security vulnerabilities from the threat dictionary 142 are found applicable to the application by matching data source and data sink operations with labeled operations 130, the application may be evaluated for potential security vulnerabilities and a report 150 generated.

Figure 2:
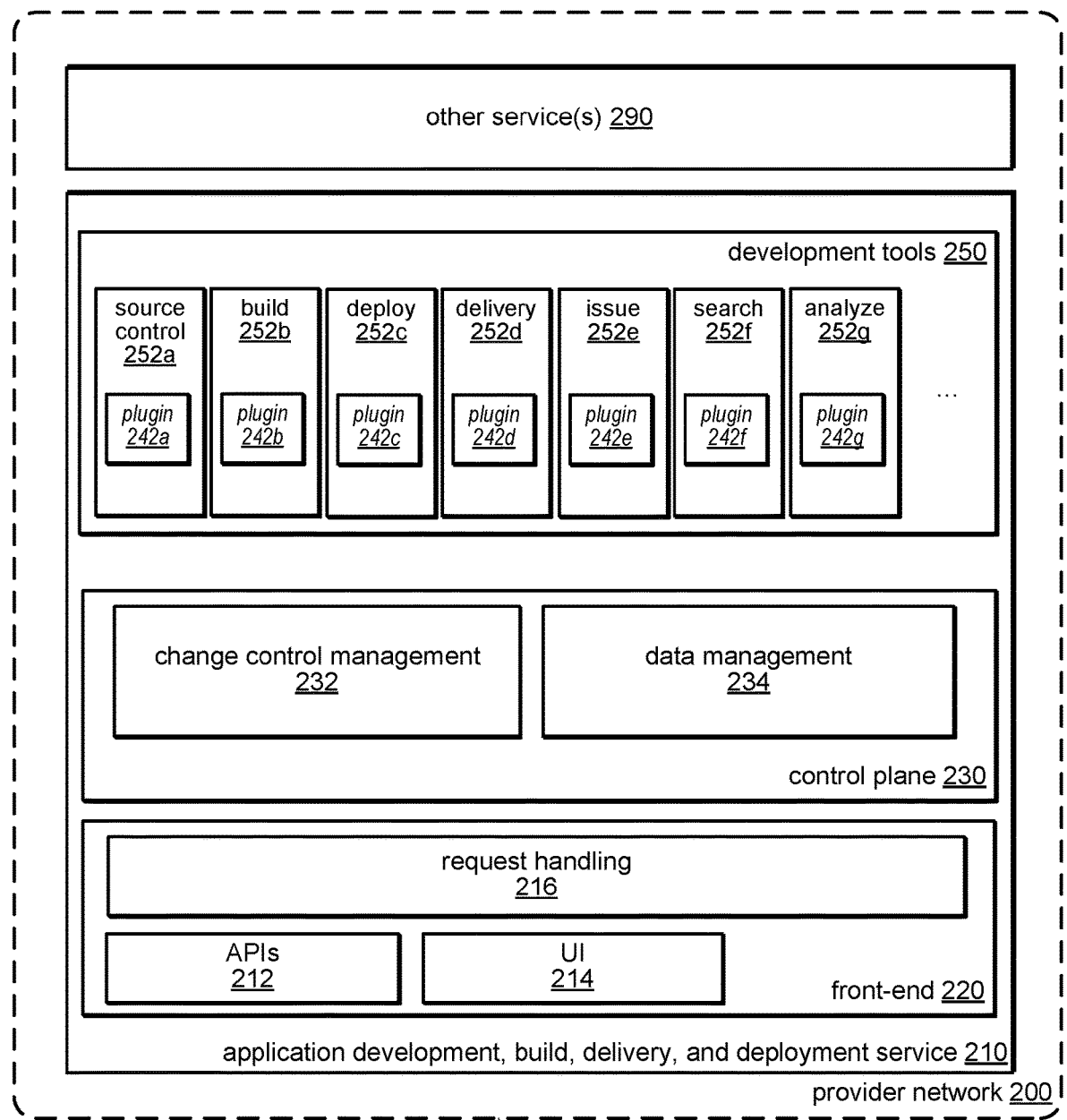
FIG. 2 is a block diagram illustrating a provider network that may implement an application development, build, deployment, and delivery service that implements a threat analysis tool, according to some embodiments.

FIG. 2 is a block diagram illustrating a provider network that may implement an application development, build, deployment, and delivery service that implements a threat analysis tool, according to some embodiments. Provider network 200 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 270 may be attached to the overlay network 260 so that when a client provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 3-7 provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application development, build, delivery, and deployment service 210 may implement interface 220 which may include various features for interacting including Application Programming Interfaces (APIs) 212 and a User Interface (UI). For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications Text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232 and data set management 234. Data set management 234 may accept data from data providers, manage schemas for the data, manage subscriptions for data consumers and store non-authoritative copies of the data. Change control management 232 may manage potential changes that can be pre-evaluated, mediate between change approvers, and change performers, and maintain an authoritative reference to the desired state of each resource under its governance.

As noted earlier, plugins may include plugins 242a, 242b, 242c, 242d, 242e, 242f and 242g which may be used to access various development tools 250, such as the native tools 150 of FIG. 1, including but not limited to source control 252a, build 252b, deploy 252c, delivery pipeline 252d, issue handling 252e, text search 252f and code analysis 252g, such as the threat analyzer tool 100 of FIG. 1. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own programmatic interfaces or APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for an interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange ( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management

234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI 214 without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252*f* may be a subscriber to various documents events that add, delete, or modify documents in order to make corresponding updates to inverted indexes.

FIG. 3 is a diagram illustrating an example vulnerability dictionary, according to some embodiments. A vulnerability dictionary or database 300 may summarize known vulnerabilities in form of a taint triplet, i.e. a <source, sink, sanitizer>, in some embodiments. Each row of the dictionary summarizes one instance of a security vulnerability and may include a data source field 311, data sink field 312 and a data sanitizer field 313. Also shown is an attack description field 310 and a severity category 314 for reporting purposes, in some embodiments. It should be understood that these fields are merely examples of fields that may be used in a vulnerability dictionary and any number of additional fields may be envisioned.

As an example, the first row 320*a* demonstrates one possible Structured Query Language (SQL) injection attack from an attacker controllable input, specifically from a network request input (source), to a database query command (sink) that should be mitigated using a database sanitizer (sanitizer) to check whether any malicious SQL command was inserted in the input, in some embodiments. The second row 320*b* demonstrates one possible code injection attack from an attacker controllable input, specifically from a network request input (source), to a file IO command (sink) that should be mitigated using a shell command sanitizer (sanitizer). A similar attack for logging is shown in 320*c*, in some embodiments, while the fourth and fifth row 320*d* shows two possible access control attacks from an attacker controllable input, specifically from a network request (source), to different (sink) that should be mitigated using an authentication sanitizer. It should be noted that a given vulnerability may be represented, in some embodiments, by a single taint triplet, such as in 320*a*, 320*b* and 320*c* when the vulnerability may be defined using only a single source and sink, where other vulnerabilities may be represented, in some embodiments, by multiple taint triplets, such as in 320*d*, when the vulnerability may have multiple potential sources, sinks or both.

In some embodiments, a vulnerability dictionary or database 300 may summarize all known vulnerabilities while in other embodiments all vulnerabilities may be collectively described using multiple vulnerability dictionaries. Furthermore, clients or users of a security vulnerability analysis tool may wish to provide customized vulnerability dictionaries for one or more applications to analyze. As a result, a security analysis may be performed using one or more vulnerability dictionaries or databases 300, in some embodiments.

Figure 4:
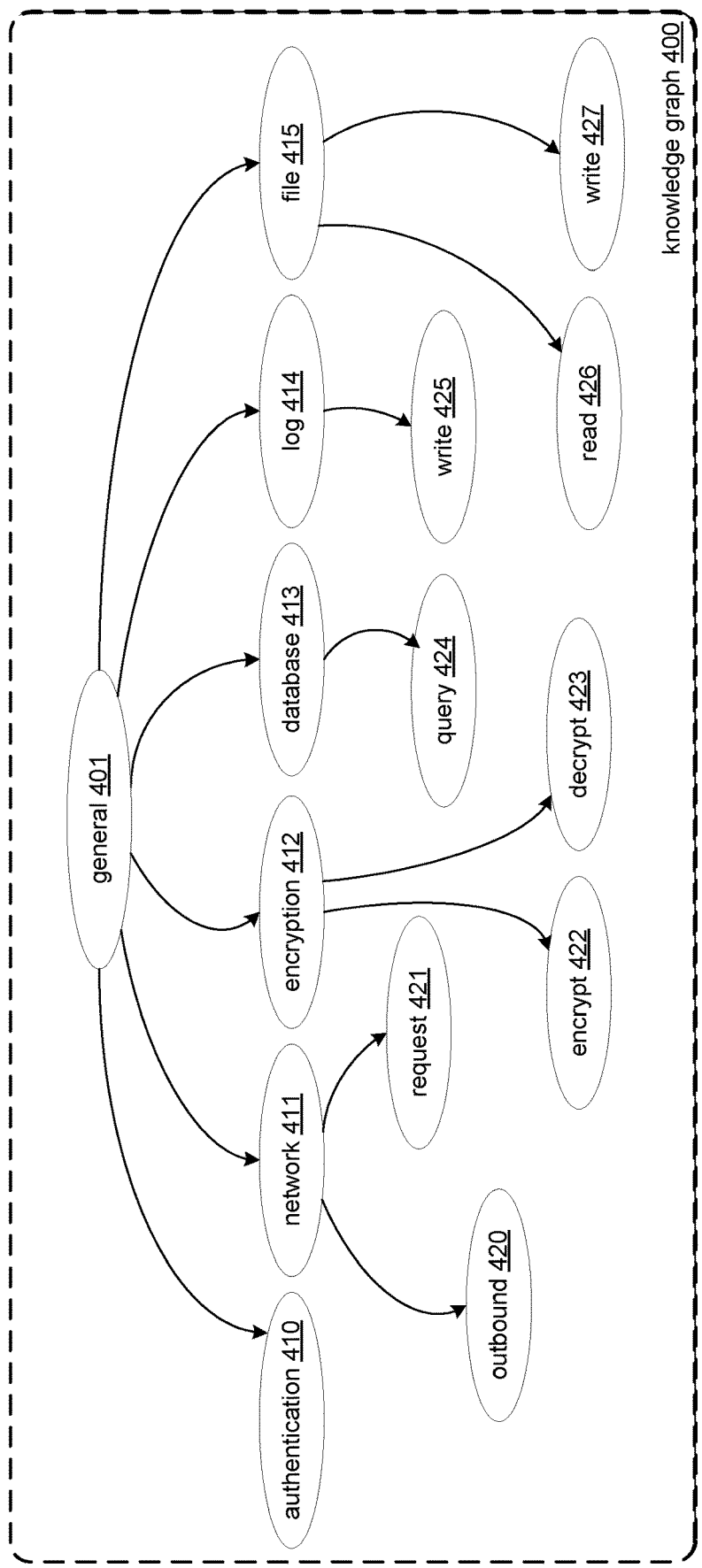
FIG. 4 is a diagram illustrating a knowledge graph defining operation types for a security vulnerability analysis tool, according to some embodiments.

FIG. 4 is a diagram illustrating a knowledge graph defining operation types for a security vulnerability analysis tool, according to some embodiments. A knowledge graph 400 represents a holistic understanding of all use cases for a program Application Programming Interface (API), where the use cases may be denoted in a tree structure, extendable to a Directed Acyclic Graph (DAG), and each node stores well-known APIs under that category. The knowledge graph 400 may form the basis for the knowledge base 122 as shown in FIG. 1 and may include nodes defining all operation types needed to cover known security attack provided in a vulnerability dictionary 300 as discussed above in FIG. 3.

The knowledge graph may be used to "read" application code to understand each API used in the application by classifying it into one or more knowledge nodes. For example, if a log.info( ) operation is used in the code, then from a well-known API mapping the first parameter of log.info( ), or log.info( )[param( )], may be used for "Log.Write" and "File.Write".

A knowledge graph may have a top-level classification, denoted as general 401 in the illustrated example, in some embodiments. Some APIs, functions, methods, and operations may be classified in this category if no more suitable classification exists. The general classification 401 may further include a second level set of classifications such as authentication 410, network 411, encryption 412, database 413, log 414 and file 415 in some embodiments. It should be understood, however, that these are merely example classification categories and that any number of categories may be envisioned. Furthermore, a knowledge graph may contain classifications for a number of libraries or collections of well-known code, operations, methods, functions, programmatic interfaces, etc. or may contain classifications for only a single code library, with multiple knowledge graphs forming the basis of the knowledge base 122 as shown in FIG. 1. As such, a particular knowledge graph may have a different top-level classification than shown in the example. These examples are not intended to be limiting and any number of implementations may be envisioned.

Additional sub-classifications may further be employed, such as the outbound 420 and request 421 classifications for network 411, the encrypt 422 and decrypt 423 for encryption 412, the query 424 for database 413, the write 425 for log 414 and the read 426 and write 427 for file 415. These examples are not intended to be limiting and any number of implementations may be envisioned.

FIG. 5 is a diagram illustrating knowledge labels providing operation types associated with a knowledge graph, according to some embodiments. A knowledge label dictionary or database 500 may summarize all known functions, methods and operations of a known code base, in some embodiments. Each row of the knowledge label dictionary 500 summarizes one instance of a function, method or operation and may include a library operation field 510 and a knowledge label field 520. Various knowledge labels 520 may be defined in coordination with the collection classifications provided in a knowledge graph as discussed above in FIG. 4. It should be understood that these fields are merely examples of fields that may be used in a knowledge label dictionary and any number of additional fields may be envisioned.

Figure 6:
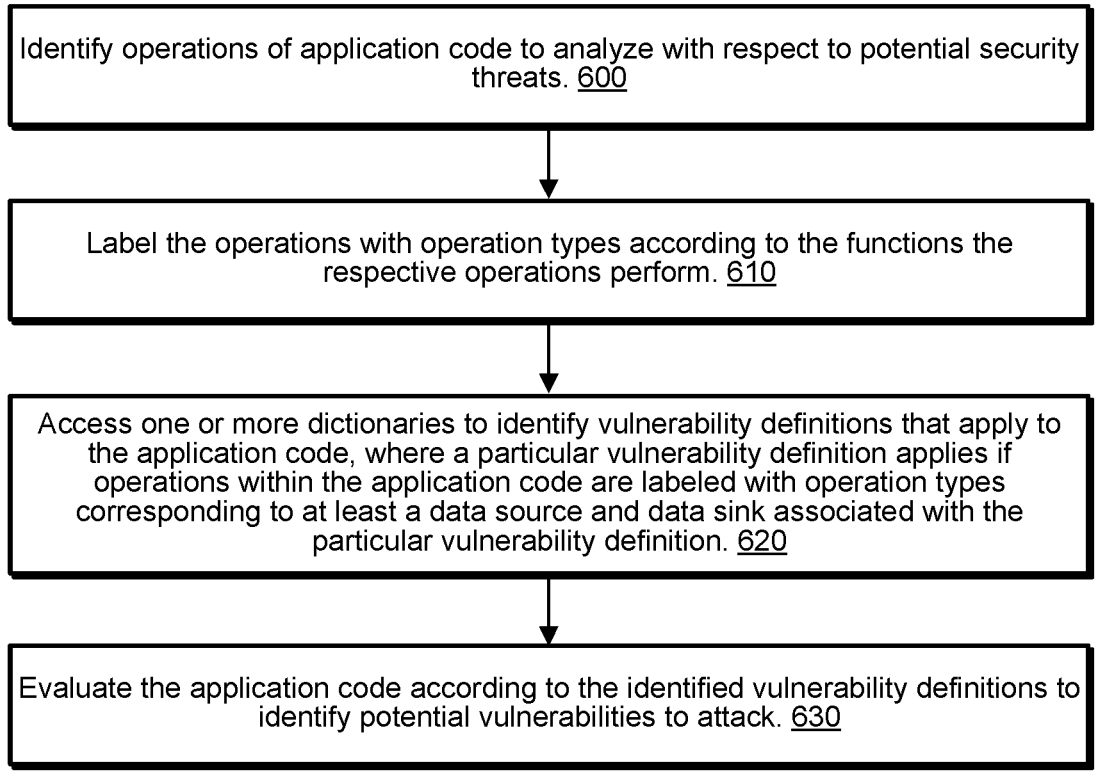
FIG. 6 is a flow diagram illustrating performing a security threat analysis using inferred application operations, according to some embodiments.

FIG. 6 is a flow diagram illustrating performing a security threat analysis using inferred application operations, according to some embodiments. An application, such as the application 110 as shown in FIG. 1, may be provided for security threat analysis, in some embodiments. The process begins in step 600 where a number of operations, methods or functions of application code, such as the local operations 112 and the library operations 114 of FIG. 1, are identified to analyze with respect to potential security threats. The application may be implemented in the form of a compiled language or in an interpreted, or scripted, language in various embodiments. In applications implemented using a compiled language, the application code may be analyzed in either a source code form or a compiled, bytecode form while in applications implemented using an interpreted or scripted language, the application code or script may be analyzed directly, in various embodiments. The application may employ various well-known code libraries and determination of these libraries may be performed in various ways. In applications implemented using a compiled language, these libraries may be identified using linkage table information in the application or using build process information for the application while in applications implemented using an interpreted language the application code may indicate the use of specific libraries directly. These examples are not intended to be limiting, and any number of means of analyzing application code and associated libraries may be envisioned.

At step 610, the process may then label the identified operations with operation types according to the specific functions that the respective operations perform. This labeling step may be performed, for example, by the labeler 120 of FIG. 1 using machine learning models 124 and knowledge base 122 also shown in FIG. 1. This labeling process is described in greater detail below in FIG. 7.

As shown in step 620, one or more security vulnerability, or taint, dictionaries, such as the threat dictionary 142 of FIG. 1, may then be accessed to determine potential vulnerabilities of the application, in various embodiments. To determine if a particular threat definition, such as a row 320 in the vulnerability dictionary 300 of FIG. 3, applies to the application, the process may determine if at least a data source and data sink, such as the source 311 and sink 312 of FIG. 3, are defined among the labeled operations. If both a data source and data sink are defined within the application's labeled operations, the particular threat definition may be added to a list of threat definitions to be evaluated for the application code, in some embodiments. In some embodiments, at least some threat definitions of the one or more security vulnerability dictionaries may be determined to not applicable to the application due to not having a matching data source or data sink definition among the labeled operations. Thus, at least one threat definition of the one or more security vulnerability dictionaries may be excluded from the list of threat definitions to be evaluated for the application code, in some embodiments.

Once a list of threat definitions has been determined, as shown in 630 the application code may be evaluated according to individual ones of the threat definitions to identify potential vulnerability of the application to attack. The evaluation may employ determining if tainted data received from a data source is passed to a data sink without first being processed by a data sanitizer operation of a threat definition, such as the sanitizer 313 as shown in FIG. 3. Should tainted data be passed to a data sink, an entry in a report, such as the report 150 of FIG. 1, may be created documenting a potential security threat to the application.

As the process of FIG. 6 relies on a knowledge base, such as the knowledge base 122 of FIG. 1, and a threat dictionary, such as the threat dictionary 142 of FIG. 1, these various dictionaries may, in some embodiments, be updated with additional or update threat and operation type information. As such, if a dictionary is updated the process shown in FIG. 6 may be executed again, or executed periodically, either manually or automatically, to generate updated reports of potential security threats to the application, in some embodiments.

Figure 7:
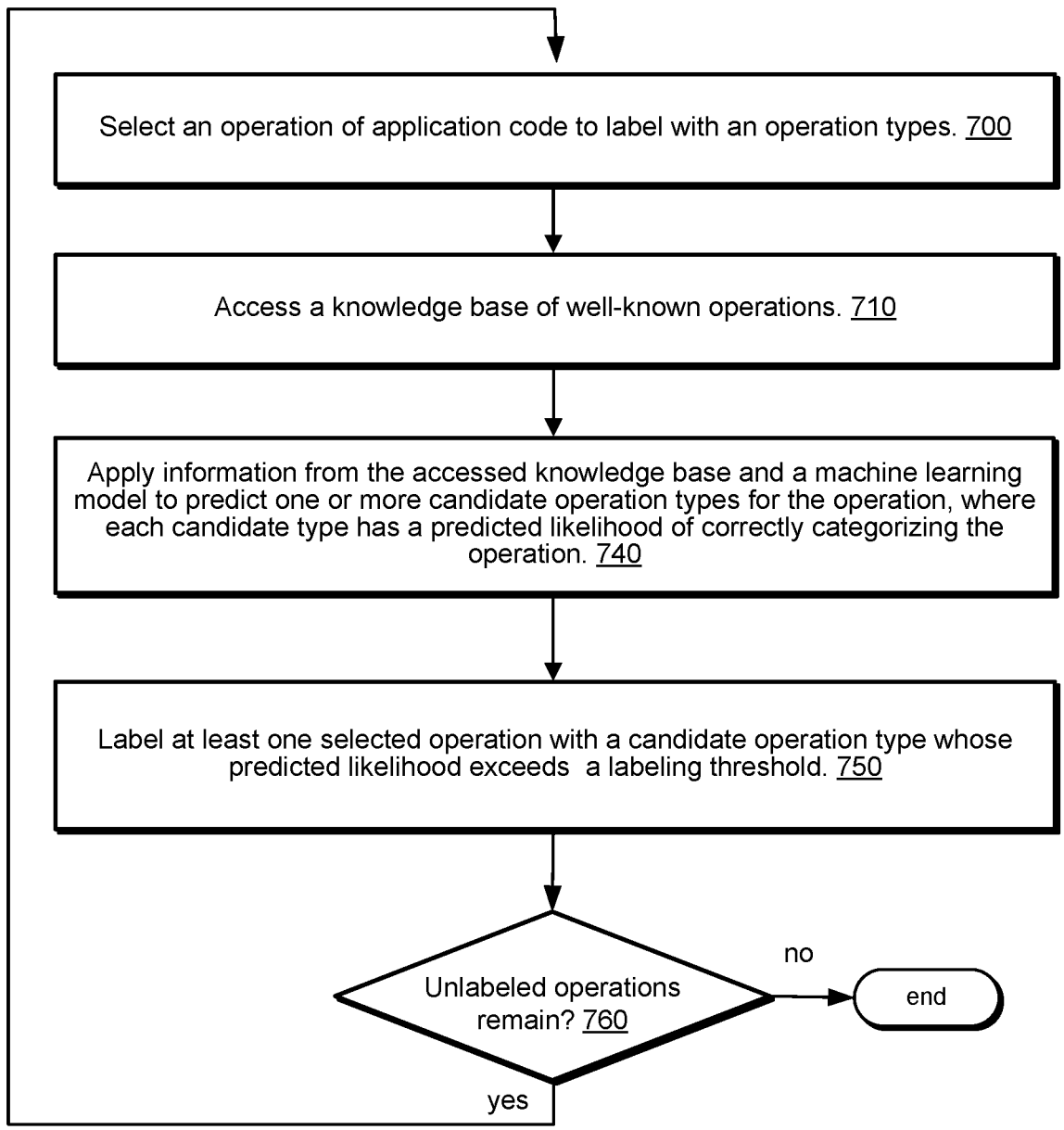
FIG. 7 is a flow diagram illustrating inferring application component types, according to some embodiments.

FIG. 7 is a flow diagram illustrating inferring application component types, according to some embodiments. As discussed in FIG. 6 above, application code may have a number of operations, methods or functions of application code, such as the local operations 112 and the library operations 114 of FIG. 1, identified to analyze with respect to potential security threats. The process begins at step 700 where an unlabeled operation of application code may be selected for labeling, in some embodiments.

As shown in step 710, the unlabeled operation may then be determined to be well-known by determining if the operation matches an entry in one or more knowledge label dictionaries, such as the knowledge label dictionary 500 of FIG. 5, of a knowledge base such as the knowledge base 122 of FIG. 1. If the selected operation is well-known, the operation may be labeled as being of an operation type identified in the matching entry of the knowledge base. Well-known operations, functions, methods and APIs, however, may account for only a small portion of an application or program. Therefore, a machine learning approach to label the selected operation according to similarity of naming and usage pattern of the operation may then be employed, in some embodiments.

A machine learning model, such as the machine learning model 124 of FIG. 1, may be trained using well-known APIs, functions or operations such as those included in a knowledge base, such as the knowledge base 122 of FIG. 1, in some embodiments. As shown in 740, A similarity propagation technique may be employed by a labeler, such as the labeler 120 of FIG. 1, to generate a confidence score, or predicted likelihood, of the selected operation for each candidate node representing a candidate operation type in a knowledge graph, such as the knowledge graph 400 of FIG. 4, of the knowledge base, in some embodiments.

Then, as shown in 750, the selected operation may be labeled with at least one operation type from among the candidate operation types, the labeled operation type having a confidence score or predicted likelihood that exceeds a labeling threshold, in some embodiments. The process may then proceed to step 760.

As shown in 760, the process may then determine if unlabeled operations remain. If unlabeled operations remain, as shown in a positive exit from 760, the process may return to step 700, in some embodiments. If no unlabeled operations remain, as shown in a negative exit from 760, the process is complete.

Figure 8:
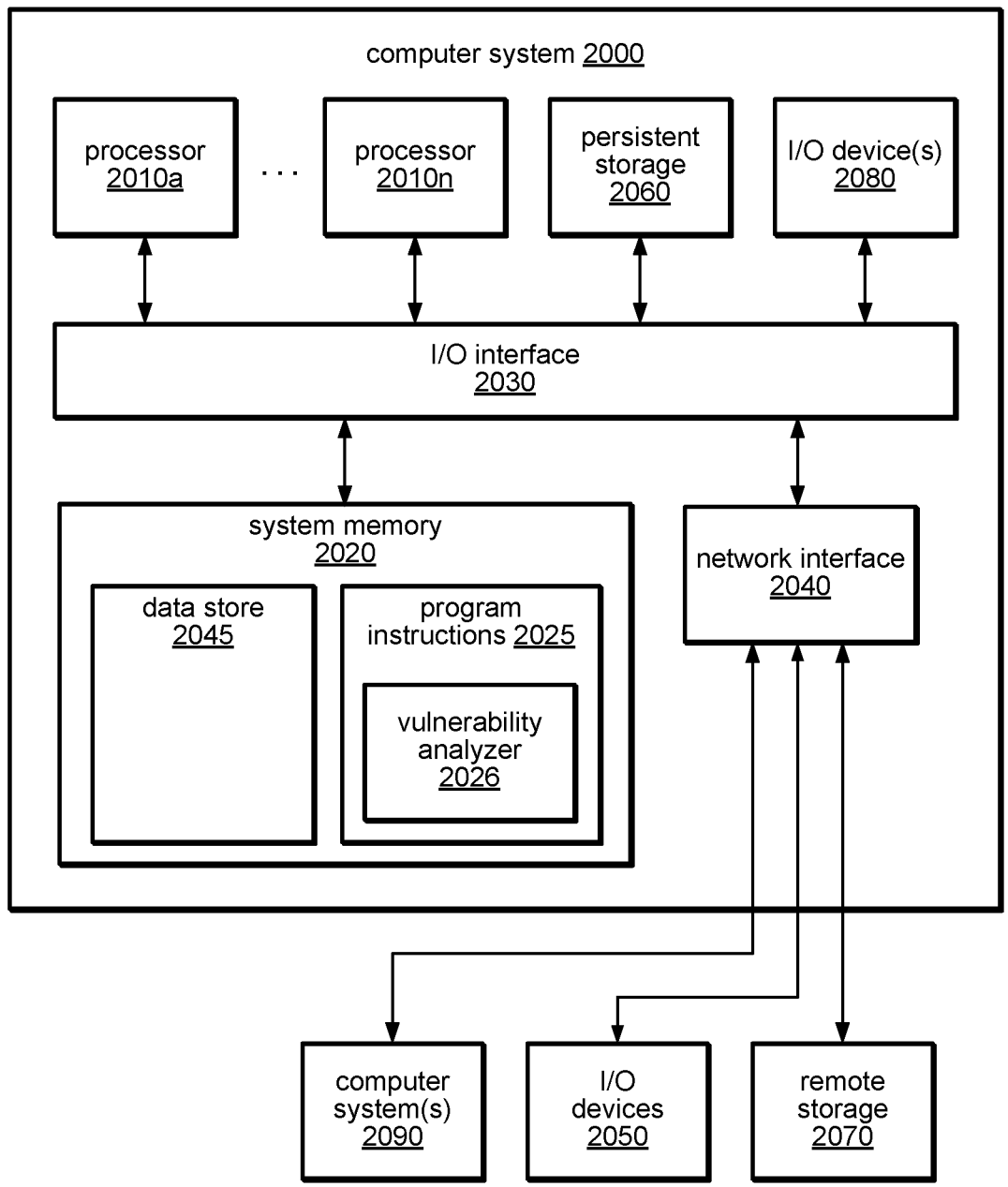
FIG. 8 is a block diagram illustrating an example computer system, according to various embodiments.

Any of various computer systems may be configured to implement processes associated with a technique for multi-region, multi-primary data store replication as discussed with regard to the various figures above. FIG. 8 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 8 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for a vulnerability analyzer as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 8 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, SolarisTM, MacOSTM, WindowsTM, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory storing program instructions that, when executed on the one or more processors, implement a security vulnerability analyzer configured to:
label a plurality of operations of an application with respective operation types according to respective functions performed by individual ones of the plurality of operations, wherein the respective operation types comprise source operations and sink operations, and wherein to label the plurality of operations of the application with the respective operation types the security vulnerability analyzer is configured to:
apply a knowledge base of well-known operations accessed by the application using programmatic interfaces;
apply a machine learning model to respective ones of one or more additional operations of the application to identify one or more candidate operation types for the respective one or more additional operations, wherein the machine learning model is trained according to a plurality of operations of one or more programmatic interfaces; and
select respective labels of operation types from among the respective one or more candidate operation types for the respective ones of the one or more additional operations having respective likelihoods that exceed an operation type threshold;
access one or more security vulnerability dictionaries to identify at least one security vulnerability definition applicable to the application, wherein identifying the at least one security vulnerability definition comprises identifying at least one vulnerability definition of the one or more security vulnerability dictionaries with a source operation and a sink operation that correspond to respective ones of the labeled plurality of operations and with a security vulnerability in an information flow between the source operation and the sink operation; and
evaluate the application according to the identified at least one security vulnerability definition to perform a security vulnerability analysis for the application.

2. The system of claim 1, wherein the one or more security vulnerability dictionaries comprise:
a security vulnerability dictionary of known security exploits shared by the application and one or more additional applications; and
another security vulnerability dictionary defined for the application by a developer of the application.

3. The system of claim 1, wherein the security vulnerability analyzer is configured to:
receive an updated version of at least one of the one or more security vulnerability dictionaries;

access the updated version of the at least one of the one or more security vulnerability dictionaries to identify at least one updated security vulnerability definition applicable to the application; and evaluate the application according to the identified at least one updated security vulnerability definition to perform another security vulnerability analysis for the application.

4. The system of claim 1, wherein evaluating the application according to the identified at least one security vulnerability definition comprises determining if the application includes a labeled operation qualifying as a sanitizer operation for the identified at least one security vulnerability definition.

5. A method, comprising:
performing a security vulnerability analysis for an application, comprising:
labeling, according to a machine learning model, a plurality of operations of the application with respective operation types according to respective functions performed by individual ones of the plurality of operations, wherein the respective operation types comprise source operations and sink operations, and wherein the machine learning is trained according to a plurality of operations of the application;
accessing one or more security vulnerability dictionaries to identify at least one security vulnerability definition applicable to the application, wherein identifying the at least one security vulnerability definition comprises identifying at least one vulnerability definition of the one or more security vulnerability dictionaries with a source operation and a sink operation that correspond to respective ones of the labeled plurality of operations and with a security vulnerability in an information flow between the source operation and the sink operation; and
evaluating the application according to the identified at least one security vulnerability definition.

6. The method of claim 5, wherein labeling the plurality of operations of the application with the respective operation types comprises applying a knowledge base of operations implementing programmatic interfaces accessed by the application.

7. The method of claim 6, wherein labeling the plurality of operations of the application with the respective operation types further comprises:
applying the machine learning model to at least a portion of the plurality of operations to identify one or more candidate operation types; and
selecting respective labels of operation types from among the respective one or more candidate operation types for individual ones of the plurality of operations having respective likelihoods that exceed an operation type threshold.

8. The method of claim 5, further comprising:
receiving an updated version of at least one of the one or more security vulnerability dictionaries;
accessing the updated version of the at least one of the one or more security vulnerability dictionaries to identify at least one updated security vulnerability definition applicable to the application; and
evaluating the application according to the identified at least one updated security vulnerability definition to perform another security vulnerability analysis for the application.

9. The method of claim 5, wherein the one or more security vulnerability dictionaries comprise a security vulnerability dictionary of security exploits shared by the application and one or more additional applications.

10. The method of claim 5, wherein the one or more security vulnerability dictionaries comprise a security vulnerability dictionary defined for the application by a developer of the application.

11. The method of claim 5, wherein the respective operation types further comprise sanitizer operations, and wherein evaluating the application according to the identified at least one security vulnerability definition comprises determining if the application includes a labeled operation of an identified sanitizer operation type for the identified at least one security vulnerability definition.

12. The method of claim 5, wherein the application is written using source code of a compiled language and distributed in a bytecode format, and wherein the security vulnerability analysis is performed using the source code of the application.

13. The method of claim 5, wherein the application code is written using source code of a compiled language and distributed in a bytecode format, and wherein the taint analysis is performed using the bytecode format of the application code.

14. One or more non-transitory computer-accessible storage media storing program instructions that when executed on or across one or more computing devices cause the one or more computing devices to implement taint analysis, comprising:
labeling, according to a machine learning model, a plurality of operations of application code with respective operation types according to respective functions performed by individual ones of the plurality of operations, wherein the respective operation types comprise source operations and sink operations, and wherein the machine learning is trained according to a plurality of operations of the application;
accessing one or more taint databases to identify at least one taint definition applicable to the application code, wherein identifying the at least one taint definition comprises identifying at least one vulnerability definition of the one or more taint databases with a source operation and a sink operation that correspond to respective ones of the labeled plurality of operations and with a security vulnerability in an information flow between the source operation and the sink operation; and
evaluating the application code according to the identified at least one taint definition to perform the taint analysis for the application code.

15. The one or more non-transitory computer-accessible storage media of claim 14, wherein labeling the plurality of operations of the application code with the respective operation types comprises applying a knowledge base of operations implementing Application Programming Interfaces (APIs) accessed by the application code.

16. The one or more non-transitory computer-accessible storage media of claim 15, wherein the plurality of operations comprises well-known operations identified in the knowledge base of operations and one or more additional operations, and wherein labeling the plurality of operations of the application code with the respective operation types further comprises:
applying the machine learning model to the one or more additional operations to identify one or more candidate operation types; and
selecting respective labels of operation types from among the respective one or more candidate operation types for individual ones of the one or more additional operations having respective likelihoods that exceed an operation type threshold.

17. The one or more non-transitory computer-accessible storage media of claim 14, the taint analysis for an application code further comprising:
   receiving an updated version of at least one of the one or more taint databases;
   accessing the updated version of the at least one of the one or more taint databases to identify at least one updated taint definition applicable to the application code; and
   evaluating the application code according to the identified at least one updated taint definition to perform another taint analysis for the application code.

18. The one or more non-transitory computer-accessible storage media of claim 14, wherein the one or more taint databases comprise a taint dictionary of security exploits shared by the application code and additional application code.

19. The one or more non-transitory computer-accessible storage media of claim 14, wherein the one or more taint databases comprise a taint dictionary defined for the application code by a developer of the application code.

20. The one or more non-transitory computer-accessible storage media of claim 14, wherein the respective operation types further comprise sanitizer operations, and wherein evaluating the application code according to the identified at least one taint definition comprises determining if the application code includes a labeled operation of an identified sanitizer operation type for the identified at least one taint definition.

* * * * *